United States Patent Office 3,645,977
Patented Feb. 29, 1972

3,645,977
ACRYLATE-ACRYLIC ACID-N-VINYL URETHANE TERPOLYMERS
Larry G. Wolgemuth, Cherry Hill, N.J., and William H. Fritock, Glenolden, Pa., assignors to Atlantic Richfield Company, New York, N.Y.
No Drawing. Filed Jan. 9, 1970, Ser. No. 1,855
Int. Cl. C08f 15/40
U.S. Cl. 260—77.5 BB          14 Claims

ABSTRACT OF THE DISCLOSURE

Heat-curable terpolymers comprising the residues of an acrylate, an acrylate acid and an N-vinyl urethane are baking with various cross-linking agents such as epoxides, ureas or melamines. These thermosetting coatings may be incorporated into paint coating systems, electrocoating systems, fibers and adhesives.

An object of the present invention is to prepare solid terpolymers utilizing an acrylate, an acrylic acid and an N-vinyl urethane.

A further object of this invention is to prepare novel solid terpolymers comprising the residues of an acrylate, an acrylic acid and an N-vinyl urethane by polymerizing the monomers in the ratio of about 1 to 20 moles of an acrylate to about 1 to 20 moles of an acrylic acid to about 1 to 20 moles of an N-vinyl urethane. More preferred terpolymers are made from ratios of monomers in the range of about 1 to 5 moles of an acrylate to about 1 to 5 moles of an acrylic acid to about 1 to 5 moles of an N-vinyl urethane.

A further object of this invention is to prepare novel heat-curable terpolymers capable of forming hard, transparent coatings on solid substrates by heating in the presence of cross-linking agents such as epoxides, ureas or melamines. These coatings may advantageously be incorporated into paint coating systems, electrocoating systems, fibers or adhesives.

These objectives are accomplished by mixing the three monomers, an acrylate, an acrylic acid and an N-vinyl urethane in various mole ratios and polymerizing to form substantially random addition terpolymers. The polymerization step can be conducted at suitable temperatures, for instance, up to about 100° C., in bulk or in solution systems using free radical polymerization catalysts capable of polymerizing ethylenically-unsaturated monomers. Organic peroxides and peroxy esters, e.g. cumene hydroperoxide and tertiary butyl benzoyl hydroperoxide, an azo compound, e.g. 2,2'-azo bis(2-methyl propionitrile) and redox systems such as persulfate-bisulfite systems, e.g. potassium persulfate-sodium bisulfite, are useful polymerization catalyts for the preparation of the novel terpolymers.

The acrylates useful in the present terpolymers are a known class of compounds which can be prepared from acrylic acid and α-substituted derivatives thereof, such as methacrylic acid and α-chloroacrylic acid, and alcohols by conventional esterification methods. These acrylates may be designated by the structural formula

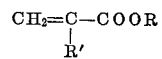

wherein R' is hydrogen, halogen or lower alkyl, and R is a hydrocarbyl group of from 1 to about 12 carbon atoms. The R group may be substituted but is non-reactive under the polymerization conditions. The preferred R groups are alkyl e.g. lower alkyl, cycloalkyl and aralkyl groups of from 1 to about 12 carbon atoms such as methyl, ethyl, isopropyl, n-butyl, 2-methyl hexyl, octyl, dodecyl, cyclopropyl, cyclohexyl, cyclooctyl, benzyl, p-methyl benzyl and phenethyl. Exemplary suitable acrylates are n-butyl acrylate, ethyl methacrylate, benzyl acrylate and methyl α-chloroacrylate.

The acrylic acids useful in the novel terpolymers are a known class of compounds comprising acrylic acid and α-substituted derivatives thereof, wherein the alpha-substituents may be lower alkyl or halogen. Examples of such alpha-substituted acrylic acids are methylacrylic acid and α-chloroacrylic acid. The acids have the formula noted above for the acrylates except the R of the latter is replaced by hydrogen.

The N-vinyl urethanes useful in the novel terpolymers may be designated by the structural formula

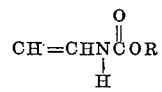

wherein R is as designated above regarding the acrylate. Again, the preferred R groups are alkyl, cycloalkyl and aralkyl groups of from 1 to about 12 carbon atoms with lower alkyl being more preferred. The N-vinyl urethanes may be pepared by the known reaction of vinyl isocyanate and alcohols at low temperatures, i.e., approximately 0° C., as disclosed, for example, on pages 74 and 75 of Polyurethanes, Chemistry and Technology, Part I, by Saunders et al. (1962).

The cross-linking agents useful herein are well recognized in the art. Particularly useful as cross-linking agents herein, however, are low molecular weight epoxy resins, urea-aldehyde resins and melamine-formaldehyde resins. The cross-linking agents are generally used in amounts such that about 0.1 to 2.0 moles of cross-linking agent per free carboxyl group, based on the acid number, in the terpolymer is present. Normally, the use of about 0.5 mole of cross-linking agent per mole of free carboxyl group, based on the acid number, is sufficient for rapid cure to form high impact coatings with the terpolymers of this invention.

Epoxy resins as a class are well known in the art such as Shell Chemical Company's "Epon" (trademark) resins, the diglycidyl ethers of bisphenol A (para,para'-isopropylidene diphenol) prepared from the condensation of epichlorhydrin and para,para'-isopropylidene diphenol; the cycloaliphatic epoxide resins, the epoxidized novolac resins, the epoxidized oils and epoxidized phenol formaldehyde resins. Lower molecular weight, liquid epoxide resins are preferred and particularly those of the "Epon" represented by the general formula

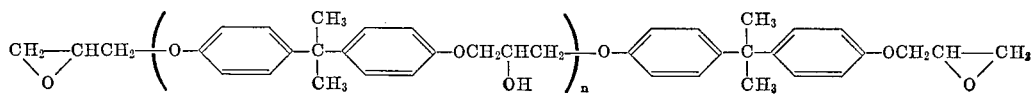

wherein n usually has an average value of 2 to about 10. Useful "Epon" resins include

| Physical state | | Molecular weight average | Epoxide equivalent weight |
|---|---|---|---|
| "Epon" resin: | | | |
| 812 | Liquid | 306 | 140–160 |
| 815 | do | 330 | 175–195 |
| 820 | do | 350 | 180–195 |
| 826 | do | | 180–188 |
| 828 | do | 380 | 185–192 |
| 830 | do | | 190–210 |
| 834 | do | 470 | 230–280 |
| 836 | M.m.p. 40–45° C. | | 290–335 |
| 871 | Liquid | | 390–470 |
| 872 | do | | 650–750 |

Advantageous urea cross-linking agents are the polymeric reaction products of urea and an aldehyde, particularly formaldehyde, of the "methylol" type modified by further reaction with monohydric alcohols of up to about 12 carbon atoms, particularly methanol and butanol. These reaction products are generally at least partially soluble in organic solvents and are particularly fast curing.

Advantageous melamine-formaldehyde cross-linking agents for use in this invention are the hexakis(hydrocarbyloxymethyl) melamines in which the hydrocarbyl groups have up to about 12 carbon atoms, such as lower alkyl. Exemplary of these resins are hexakis (methoxymethyl) melamine; hexakis (alkoxymethyl) melamines in which the alkyl groups are mixtures of ethyl and methyl groups, e.g. at least about 25 mole percent of each, based on their total; and hexakis (alkoxymethyl) melamines in which at least two alkoxymethyl groups have 3 to 5 carbon atoms.

The following are non-limitative examples indicating specific methods of preparation of the terpolymers and coatings prepared therefrom:

EXAMPLE I

A 25 ml. round bottom flask equipped with an agitator reflux condenser and a nitrogen inlet tube was charged with 5 ml. of toluene, 2 ml. (0.014 mole) of n-butyl acrylate, 1 ml. (0.014 mole) of acrylic acid and 2 ml. (0.014 mole) of n-butyl (N-vinylcarbamate). After deaerating the reaction mixture for one-half hour with nitrogen, 15 mg. of 2,2'-azo bis (2-methyl propionitrile) catalyst was added. The reaction mixture was maintained under nitrogen purge at about 58° C., for approximately 18 hours. The thick gel formed during heating was removed, dissolved in methyl ethyl ketone and the polymer reprecipitated from n-hexane. The polymer was then purified further by additional precipitation from n-hexane.

Elemental analysis of the polymer disclosed weight percent carbon at 57.21, weight percent hydrogen as 8.13 and weight percent nitrogen as 1.17. A theoretical calculation of a 1:1:1 polymer disclosed weight percent carbon as 59.40, weight percent hydrogen as 7.00, and weight percent nitrogen as 4.04. The prepared polymer had an acid number of 248.

EXAMPLE II

A coating of the terpolymer of Example I was prepared in the following manner. 0.44 gram (.00128 mole of the terpolymer assuming a 1:1:1 ratio of monomer) was added to 1 gram of methyl ethyl ketone. Upon dissolution of the terpolymer in the methyl ethyl ketone, 0.24 gram (.00128 mole) of an epoxide cross-linking agent was added. The particular expoxide cross-linking agent used was Epon 828, a poly epoxide made from epichlorohydrin and bisphenol A having an epoxide equivalent of 175 to 210 and molecular weight of 350 to 400. The preparation of Epon 828 is disclosed in U.S. Pat. No. 3,403,088. The uncatalyzed mixture of dissolved polymer and epoxide cross-linking agent was then applied to a clean glass plate using a 4 mil bird applicator. The treated glass plate was then baked for one-half hour at about 177° C. The flash-off time for the coating was 10 minutes due to the high volatility of methyl ethyl ketone solvent. Upon removal from the oven, the coating was non-sticky and upon cooling was colorless; the coating was unaffected by the thirty-second acetone test.

The identical coating mixture of dissolved polymer and epoxide cross-linking agent was then applied to a clean Bonderite 1000 steel panel which was then baked for about one-half hour at about 188° C. Upon cooling, the resultant coating was 1.2 mils thick and had an impact resistance of 110 pounds per inch.

We claim:
1. Solid, random addition terpolymers of
(A) an acrylate having the formula

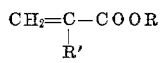

(B) an acrylic acid having the formula

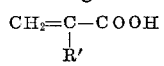

and
(C) an N-vinyl urethane having the formula

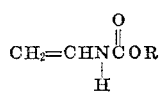

wherein R' is hydrogen, halogen or lower alkyl and R is a hydrocarbyl group of up to about 12 carbon atoms, said (A), (B) and (C) being polymerized in mole ratios of about 1 to 20 of each of (A), (B) and (C).

2. Terpolymers of claim 1 wherein R is lower alkyl.
3. Terpolymers of claim 1 wherein (A), (B) and (C) are polymerized in the mole ratio of about 1 to 5 of each of (A), (B) and (C).
4. Terpolymers of claim 2 wherein (A), (B) and (C) are polymerized in the mole ratio of about 1 to 5 of each of (A), (B) and (C).
5. Terpolymers of claim 4 wherein (A) is n-butyl acrylate, (B) is acrylic acid and (C) is n-butyl (N-vinyl carbamate).
6. A solid substrate bearing a thermosetting coating of a terpolymer of claim 1 and an epoxide, urea or melamine cross-linking agent.
7. A solid substrate bearing a thermosetting coating of a terpolymer of claim 2 and an epoxide, urea or melamine cross-linking agent.
8. A solid substrate bearing a thermosetting coating of a terpolymer of claim 3 and an epoxide, urea or melamine cross-linking agent.
9. A solid substrate bearing a thermosetting coating of a terpolymer of claim 4 and an epoxide, urea or melamine cross-linking agent.
10. A solid substrate bearing a thermosetting coating of a terpolymer of claim 5 and an epoxide, urea or melamine cross-linking agent.
11. Terpolymers of claim 1 wherein R' is hydrogen, methyl or chloro.
12. Terpolymers of claim 4 wherein R' is hydrogen, methyl or chloro.
13. A solid substrate bearing a thermosetting coating of a terpolymer of claim 11 and an epoxide, urea or melamine cross-linking agent.
14. A solid substrate bearing a thermosetting coating of a terpolymer of claim 12 and an epoxide, urea or melamine cross-linking agent.

References Cited
FOREIGN PATENTS
1,247,022   8/1967   Germany _____ 260—87.3

JOSEPH L. SCHOFER, Primary Examiner

S. M. LEVIN, Assistant Examiner

U.S. Cl. X.R.

117—124 E, 132 BE, 132 BF; 260—80.73, 836, 837 R, 851, 856